United States Patent
Sato et al.

(10) Patent No.: US 6,888,966 B2
(45) Date of Patent: May 3, 2005

(54) LENGTH CALCULATION AND DETERMINATION DEVICE, ANGLE CALCULATION AND DETERMINATION DEVICE AND IMAGE DETERMINATION SYSTEM

(75) Inventors: Hisao Sato, Matsumoto (JP); Katsumi Komagamine, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 742 days.

(21) Appl. No.: 09/726,801

(22) Filed: Nov. 29, 2000

(65) Prior Publication Data

US 2001/0019627 A1 Sep. 6, 2001

(30) Foreign Application Priority Data

Nov. 29, 1999 (JP) ............................................. 11-338157

(51) Int. Cl.⁷ ............................ G06K 9/46; G06K 9/52; G06K 9/68; G06K 9/32
(52) U.S. Cl. ........................ 382/203; 382/206; 382/218; 382/294
(58) Field of Search .................................. 382/135, 137, 382/138, 139, 140, 190, 195, 203, 209, 217, 218, 206, 294, 101

(56) References Cited

U.S. PATENT DOCUMENTS

| | | | | | |
|---|---|---|---|---|---|
| 3,748,644 | A | * | 7/1973 | Tisdale | 382/201 |
| 4,007,440 | A | * | 2/1977 | Kono et al. | 382/206 |
| 4,131,879 | A | * | 12/1978 | Ehrat | 382/135 |
| 4,482,971 | A | * | 11/1984 | Blazek | 382/135 |
| 5,581,628 | A | * | 12/1996 | Nakamura et al. | 382/101 |
| 5,793,901 | A | * | 8/1998 | Matsutake et al. | 382/294 |
| 6,272,245 | B1 | * | 8/2001 | Lin | 382/195 |

* cited by examiner

Primary Examiner—Mehrdad Dastouri
(74) Attorney, Agent, or Firm—Rosalio Haro

(57) ABSTRACT

A calculation section performs a simplified calculation to obtain lengths and/or angles using calculations of addition and multiplication, without using calculations of division, square root and inverse trigonometric function that impose heavy load to the hardware. A data storage section stores reference length data and reference angle data in a data format that is appropriate for the simplified calculation.

20 Claims, 4 Drawing Sheets

LENGTH CALCULATION AND DETERMINATION DEVICE, ANGLE CALCULATION AND DETERMINATION DEVICE AND IMAGE DETERMINATION SYSTEM

BACKGROUND OF THE INVENTION

1. Field of the Invention

The present invention relates to a length calculation and determination device, an angle calculation and determination device and an image determination system that quickly calculate and determine the length and the angle between inputted coordinate data, and determines whether an inputted image concurs with a predetermined image.

2. Description of the Related Art

There are many occasions where a computer calculates a distance (length) between two points, and determines whether the distance is longer or shorter. For example, in game software used in a home gaming apparatus, a distance between two characters is calculated to determine whether the distance is long or short, the distance between a ball and a goal is calculated to determine the positional relation between the two, and the like. Similarly, there are many instances where angles are calculated.

Japanese laid-open patent application HEI 10-123797 filed by the present applicant relates to a technique for preventing a copy machine from copying a bank note and proposes "Image Rough Determination Apparatus, . . . Color Copy Machine" that is capable of determining in a shorter period of time whether an image read by a copy machine is part of a bank note. In the invention described therein, a determination is made whether or not characteristic portions of a bank note are included in an image read by a scanner, and a comparison is made for their positional relations (distances and angles) when the characteristic portions of a bank note are included. A determination is made that the bill is included in the image read by the scanner when the positional relations are in predefined orientations with one another.

More specifically, as shown in FIG. 5, (1) a specified process is performed on images in three characteristic portions (approximately 2 centimeter squares, that are hereunder referred to as "blocks") of a bank note to create data (hereunder referred to as "bill data"), and the data is stored in a database. At the same time, data for relative positional relations D1, D2 and θ between the three blocks (BLK1, BLK2 and BLK3) are created and stored in a database. It is noted that D1 is the distance (length) of a line segment defined between the block BLK1 and the block BLK2, D2 is the distance (length) of a line segment defined between the block BLK1 and the block BLK3, and θ is an included angle defined between the line segment D1 and the line segment D2.

(2) Then, a specified process is performed on an image that is read by a scanner in order to make a copy thereof, and a determination is made whether or not the image has blocks that concur with the blocks BLK1, BLK2 and BLK3 stored in the data base. This step is hereunder referred to as "pattern matching". In this instance, each time a determination is made that the pattern of a block concurs with any one of the blocks, positional data for the location thereof is stored.

(3) When the pattern matching is completed, a determination is made as to whether a combination of the blocks BLK1, BLK2 and BLK3 exists in all of the blocks detected. When such combinations exist, relative positional relations D1, D2 and θ for all of such combinations are calculated based on the stored positional data.

(4) Lastly, the relative positional relations D1, D2 and θ are compared with one another. When the relative positional relations stored in the database concur with those detected and calculated from the image read by the scanner, a determination is made that the image read by the scanner is part of the bank note. This step is hereunder referred to as "structure matching". It is determined that the blocks BLK1, BLK2 and BLK3 compose a triangle, and the relative positional relations D1, D2 and θ represent congruent conditions of a triangle.

In this manner, it is also very important to calculate the distance (length) and angle in the prevention of copying bank notes.

It is noted that the calculation of the distance and angle in game software needs to be quickly performed in order to make the game more enjoyable. In a similar manner, the calculation of the distance and angle in the copy machine described above, as well as the determination of bank notes, need to be quickly performed in view of the necessity of recognizing an image of a bank note among a variety of different images.

However, when coordinates O (0, 0) and P (x, y) of two points on a plane are given, and the distance OP of a line segment is calculated by $OP=(x^2+y^2)^{1/2}$, a square root needs to be calculated. As a result, an operational load to the computer hardware is heavy and the calculation takes a long time. Similarly, when coordinates O (0, 0), P1 ($x_1$, $y_1$) and P2 ($x_2$, $y_2$) of three points on a plane are given, these three points are assumed to define a triangle, and an included angle θ defined between an edge OP1 and an edge OP2 is calculated by $\theta=\cos^{-1}\{(x_1 x_2+y_1 y_2)/[(x_1^2+y_1^2)^{1/2}(x_2^2+y_2^2)^{1/2}]\}$, an inverse trigonometric function and a division need to be calculated in addition to a square root. This results in a longer calculation time. A high power CPU may be used to shorten the calculation time. However, this leads to a higher cost and therefore is not preferable. Also, in the copy machine described above, the timing at which a determination is to be made as to whether or not an object image and a reference image concur with each other is important, in addition to shortening the calculation time. Depending on the timing, inconvenient situations occur. For example, a waiting period may continue for a long time, or the presence of a bank note may be recognized after portions in which the bank note is present are copied (outputted).

OBJECTS OF THE INVENTION

It is therefore an object of the present invention to provide a length calculation and determination device that performs a fast calculation based on given data and compares a calculation result with reference length data to determines if the lengths match.

It is another object of the present invention to provide an angle calculation and determination device that performs a fast calculation based on given data and compares a calculation result with reference angle data to determine if the angles match.

It is a further object of the present invention to provide an image determination system that compares an object image and a reference image and quickly and securely determines whether or not the images concur with one another.

In summary, it is an object of the present invention to provide a length calculation and determination device, an angle calculation and determination device and an image determination system that quickly calculates lengths and/or angles based on inputted data, compares the lengths and/or angles and determines the magnitudes thereof, and makes determinations of agreement or disagreement of inputted images.

SUMMARY OF THE INVENTION

To solve the problems described above, the present inventors have made sincere efforts to complete the present invention. In accordance with a first embodiment of the present invention, a length calculation and determination device comprises: (1) an operation section that calculates a length of a line segment composed of specified points that are inputted as computer readable data; (2) a data storage section that stores length data for reference lengths; and (3) a determination section that compares a calculation result obtained by the operation section with the length data in the data storage section to determine whether the length agrees with the length data within a predefined margin.

Also, the operation section performs a simplified calculation of the length of the line segment composed of the specified points, and the date storage section stores the length data in a data format appropriate to the simplified calculation.

In accordance with the present invention, when coordinates O (0, 0) and P (x, y) of two points on a plane are inputted as data, the operation section performs a simplified calculation of the length OP of a linear line (line segment) between the two points by $OPc = x^2 + y^2$. On the other hand, length data OPr for reference length is saved in such a form as a square of an actual distance. The determination section compares values of OPc and OPr to determine which one of them is longer or shorter. It is noted that an added letter c to OP means that the value of OP is a calculated value and an added letter r to OP means that the value of OP is a reference value (reference length data).

As a result, the length of a line segment can be calculated using multiplication and addition, which give lighter burden to the computer hardware, and square root calculation that requires a longer calculation time does not need to be used. Length data for reference length to be stored in the data storage section may be obtained by calculation operation performed on an on-demand basis. Also, data to be inputted in the operation section may be obtained by different manners. For example, such data may be obtained by using a scanner and performing a specified process on the data. Also, such data may be obtained by calculation by an image generation operation unit. The data is coordinate data. It is noted that the coordinate data may relate to a two-dimensional plane or a three-dimensional cube. Furthermore, the data may include numerical data for colors and identifiers such as flags.

In accordance with a second embodiment of the present invention, an angle calculation and determination device comprises (1) an operation section that calculates an angle of a specified corner of a triangle composed of specified points that are inputted as computer readable data, (2) a data storage section that stores angle data for reference angles, and (3) a determination section that compares a calculation result obtained by the operation section with the angle data in the data storage section to determine whether the angle agrees with the angle data within a predefined margin.

Also, the operation section performs a simplified calculation of the angle of the specified corner of the triangle composed of the specified points, and the date storage section stores the angle data in a data format appropriate to the simplified calculation.

In accordance with the second embodiment, when coordinates O (0, 0), P1 ($x_1$, $y_1$) and P2 ($x_2$, $y_2$) of three points on a plane are inputted as data, these points are assumed to define a triangle. The operation section performs a simplified calculation to compare a predefined parameter proportional to angle θ defined between an edge OP1 and an edge OP2. The predetermined parameter is referred to as θc to denote its relation to the desired angle, but it is actually a relationship between lines OP1 and OP2 defined as $\theta c = x_1 x_2 + y_1 y_2$. Similarly, angle data for the reference angle is likewise written in form of this parameter and referred to as θr for the sake of consistency. To maintain a proper understanding between this predefined parameter and the traditional formula for an angle, defined above, the present parameter θr is defined as $\theta r = \cos\theta \times [(x_1^2 + y_1^2)^{1/2}(x_2^2 + y_2^2)^{1/2}]$. The determination section compares values of θc and θr to determine which one of them is greater or smaller. It is noted that an added letter c to θ means that the value of θ is a calculated value and an added letter r to θ means that the value of θ is a reference value (reference angle data).

As a result, the angle can be calculated using multiplication and addition, which give lighter burden to the computer hardware. Calculations of division, square root and inverse trigonometric function that require a longer calculation time do not need to be used. In a manner similar to the first embodiment of the present invention, angle data for reference angle to be stored in the data storage section may be obtained by calculation operation performed on an on-demand basis. Also, data to be inputted in the operation section may be obtained by using a scanner and performing a specified process on the data. Also, such data may be obtained by calculation by an image generation operation unit. The data is coordinate data. It is noted that the coordinate data may relate to a two-dimensional plane or a three-dimensional cube. Furthermore, the data may include numerical data for colors and identifiers such as flags.

In accordance with a third embodiment of the present invention, an image determination system compares a triangle composed of specified points in an object image that is inputted as computer readable data with a triangle composed of specified points in a reference image, and determines that the inputted object image corresponds to the reference image when the triangles are congruent with each other. It is noted that whether not the triangles are congruent with each other is determined according to congruence conditions of triangles.

In other words, in accordance with the third embodiment of the present invention, specified points (three points) in a reference image are assumed to define a triangle, and at least one of data sets for (a) the length of three edges of the triangle, (b) the length of two edges and an included angle defined between the two edges of the triangle, and (c) the length of one edge and angles at both ends of the one edge of the triangle is stored as reference data in the data storage section. Also, at least one of data sets (in a corresponding number of the data sets stored in the data storage section) for (a) the length of three edges, (b) the length of two edges and an included angle defined between the two edges, and (c) the length of one edge and angles at both ends of the one edge of a triangle that is defined by specified points in an inputted object image is calculated. The two triangles are compared according to congruence conditions of triangles.

Simplified calculations are performed to obtain each of the lengths and each of the angles by the same means as those described in the first embodiment and the second embodiment of the present invention. The reference length data and the reference angle data are stored in the same manner as those in the first embodiment and the second embodiment of the present invention.

As a result, the length and the angle can be calculated using multiplication and addition, while calculations of division, square root and inverse trigonometric function do not need to be employed. This gives lighter burden to the computer hardware. In a similar manner as the first embodiment and the second embodiment of the present invention, length data for reference lengths and angle data for reference angles to be stored in the data storage section may be obtained by calculation operation performed on an on-demand basis. Also, data to be inputted in the operation section may be obtained by using a scanner and performing a specified process on the data. Also, such data may be obtained by calculation by an image generation operation unit. The data is coordinate data. It is noted that the coordinate data may relate to a two-dimensional plane or a three-dimensional cube. Furthermore, the data may include numerical data for colors and identifiers such as flags.

Also, in the image determination system in accordance with the third embodiment of the present invention, when each of the specified points in the reference image is identifiable, and each of the specified points inputted in the operation section is identifiable and a triangle is formed only by the specified points, the calculation is performed with respect to the triangle formed by a combination of the specified points even when the specified points inputted in the operation section are more than three points.

It is noted that a triangle has three apexes, namely, a first apex through a third apex. A specified point that defines the first apex, a specified point that defines the second apex and a specified point that defines the third apex have different properties and different identifications. In other words, the inputted data have at least flags that indicate which of the points define which of the apexes of the triangle, in addition to coordinates on a plane or coordinates on a cube.

Also, in the image determination system in accordance with the third embodiment of the present invention, when object images are successively inputted in the operation section, each time specified points are inputted, the calculation and determination operations are performed between most recently inputted points and specified points that had already been inputted.

As a result, the calculation and determination operations are performed without waiting until all of the data are inputted. Also, the calculation and determination operations are not performed between data that have already been inputted.

Furthermore, in the image determination system in accordance with the third embodiment of the present invention, when a shape defined by specified points in an object image that is inputted as computer readable data is an n-polygonal shape, and a shape defined by specified points in a reference image is an n-polygonal shape, the n-polygonal shapes are compared with each other, and a determination is made that the inputted object image corresponds to the reference image when the n-polygonal shapes are congruent with each other. It is noted that n is an integer and n>3.

For example, in the case of quadrilaterals in which n is four (4), the congruence conditions are met, for example, when the length of four edges of one of the quadrilaterals and an angle of any one of the corners thereof concur with those of the other quadrilateral.

DESCRIPTION OF THE PREFERRED EMBODIMENTS

An embodiment of the present invention is described in detail below with reference to the accompanying drawings. In the embodiment of the present invention described below, an image determination system in accordance with the third embodiment of the present invention is applied to a bank note recognition system in a color copy machine.

Construction of Bank Note Recognition System

Figure 1:
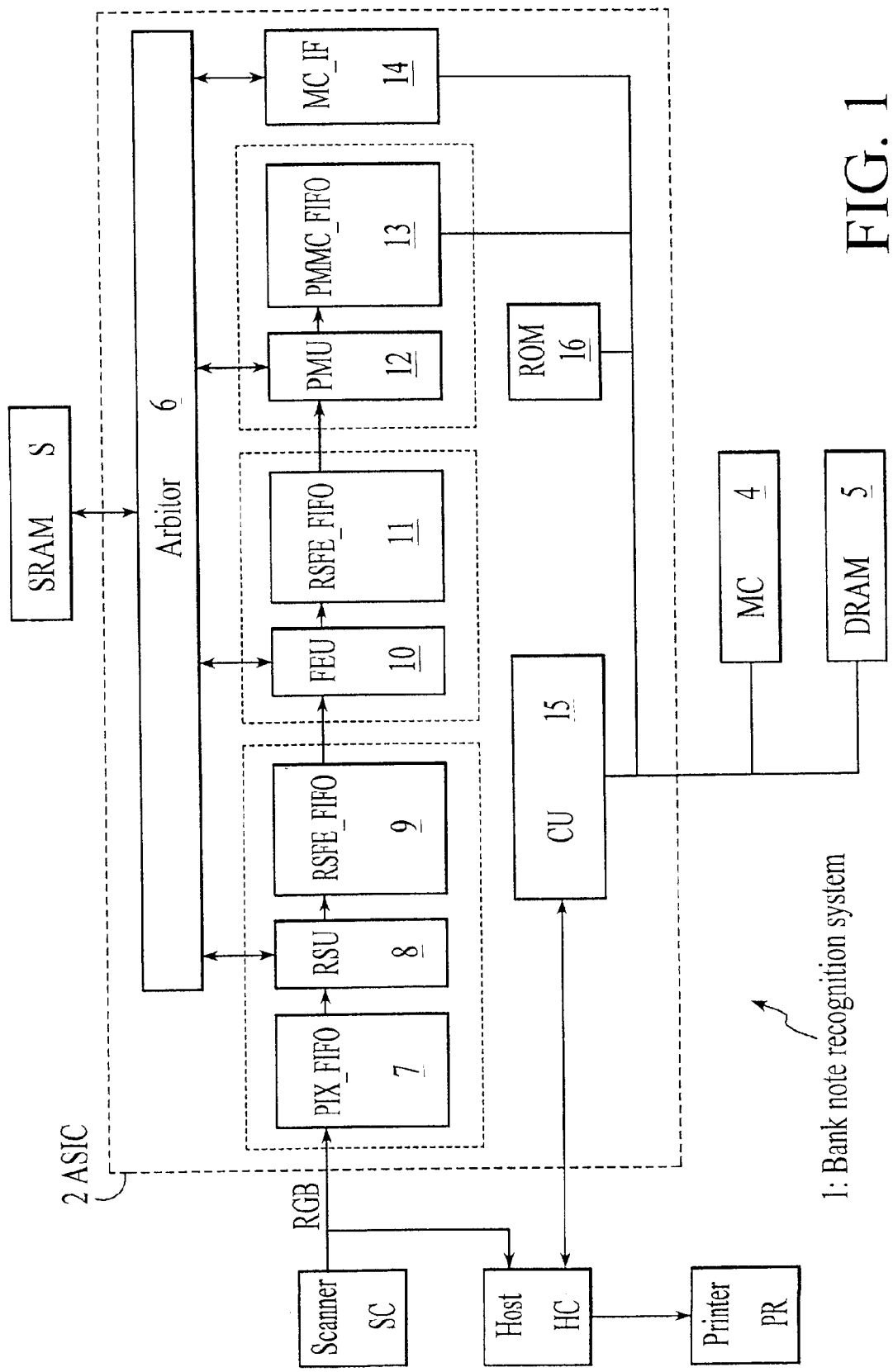
FIG. 1 schematically shows a block diagram of a structure of a color copy machine and a structure of a bank note recognition system in which an image determination system in accordance with one embodiment of the present invention is applied.

First, a construction of a bank note recognition system in which an image determination system in accordance with one embodiment of the present invention is applied is described (with reference to FIG. 1).

FIG. 1 shows a block diagram of a general construction of a color copy machine and a construction a bank note recognition system. A bank note recognition system 1 includes ASIC (Application Specific Integrated Circuit) 2, SRAM (Static Random Access Memory) 3, MC (Microcomputer) 4, and DRAM (Dynamic Random Access Memory) 5. In addition, a color copy machine includes a scanner SC, a host computer HC, and a printer PR.

An "object image" (hereunder referred to as "image") that is read by the scanner SC of the color copy machine is inputted in ASIC 2 as RGB data. ASIC 2 determines whether or not the image read by the color scanner SC is a "reference image" that is a bank note (i.e., whether or not a bank note is included in the read image), and transmits the resultant data to the host computer HC of the color copy machine. The host computer HC prohibits copying when it is determined that the read image is the bank note. On the other hand, the host computer HC outputs the image read by the scanner SC to the color printer PR to perform color copying. It is noted that RGB data is data representative of red color (Red), green color (Green) and blue color (Blue) of pixels, and its resolution is 300 dpi (dot per inch) or 600 dpi. Data for each of the colors R, G and B is 8-bit data. It is noted that the resolution and the RBG data are not limited to the values described above.

In the present embodiment, X-direction is defined by a width direction of an image read by the scanner SC, and Y-direction is defined by a length direction.

ASIC 2 is formed from devices, such as, ARBITER 6, PIX_FIFO (First In First Out) 7, a resolution conversion unit (hereunder referred to as "RSU") 8, RSFE_FIFO 9, a feature extraction unit (hereunder referred to as "FEU") 10, FEPM_FIFO 11, a pattern matching unit (hereunder referred to as "PMU") 12, PMMC_FIFO 13, an MC interface (hereunder referred to as "MC_IF") 14, a control unit (hereunder referred to as "CU") 15 and ROM (Read Only Memory) 16.

ARBITER 6 arbitrates accesses between SRAM 3 and RSU 8, FEU 10, PMU 12 and MC_IF 14. When RSU 8, FEU 10, PMU 12 or MC_IF 14 simultaneously make accesses to SRAM 3, the accesses are allowed according to a predetermined order of priority.

PIX_FIFO 7 is a FIFO that hands over RGB data from the scanner SC to RSU 8.

RSU 8 performs resolution conversion, gamma (γ) conversion and affine transformation of RGB data provided from the scanner SC, and writes the converted data in SRAM 3. The resolution conversion is conducted in a manner that the resolution of the RGB data inputted from the scanner SC is changed from 300 dpi or 600 dpi to 50 dpi to reduce the burden to each process to be conducted later. After the resolution conversion, data for each of the colors R, G and B is preferably 10-bit data. The affine transformation is conducted in a manner that RGB conversion and IRG conversion are performed in one linear transformation. After the affine transformation, the IRG data is representative of the intensity of each pixel, red color and green color. Data for each of the I, R, and G is an 8-bit data.

RSFE_FIFO 9 is a FIFO that hands over the IRG data converted by RSU 8 to FEU 10 as a command. It is noted that the IRG data is written in SRAM 3, and the IRG data is retrieved from SRAM 3 to FEU 10 by addressing.

FEU 10 extracts a feature-amount for conducting pattern matching based on the IRG data that is converted by RSU 8, and stores the extracted data (hereunder referred to as "FE data") in SRAM 3. The feature extraction is conducted in blocks of 40 dots×40 dots along the length of a line. Moreover, feature extraction is conducted on a line-by-line basis by shifting each block by 5 dots in the X-direction such that adjacent blocks in the width direction overlap each other by 35 dots. When one line is completed, blocks are shifted by 5 dots in the Y-direction to perform feature extraction of the next line. Thus, adjacent blocks in the length direction overlap each other by 35 dots.

Figure 2:
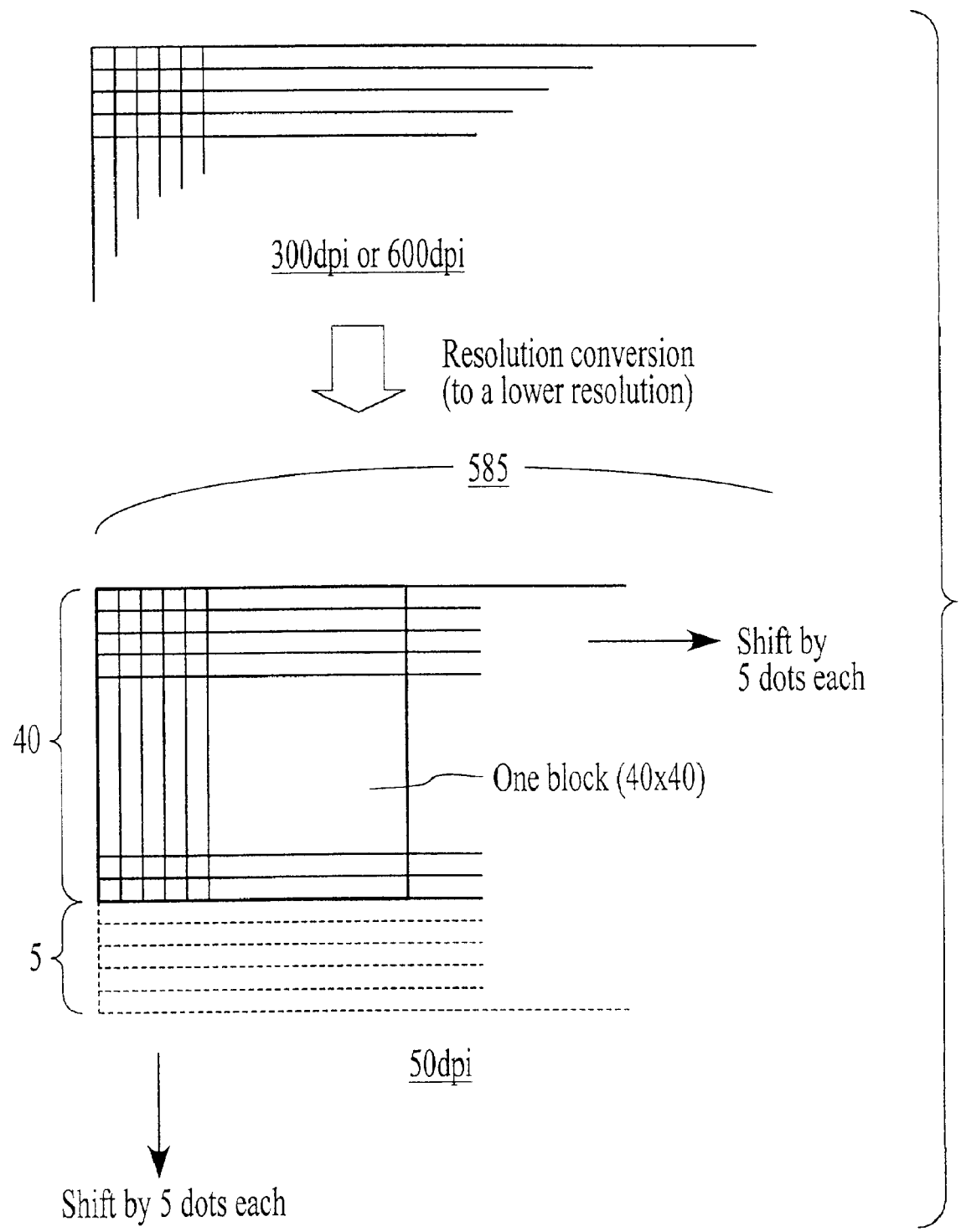
FIG. 2 shows illustrations to describe the resolution conversion and blocks used in a bank note recognition system in accordance with one embodiment of the present invention.

Illustrations in FIG. 2 are used to describe the resolution conversion and blocks. An inputted image with a resolution of 300 dpi or 600 dpi (shown in an upper portion of FIG. 2) is converted by RSU 8 to an image with a lower resolution of 50 dpi, and a feature-amount for each one block consisting of 40 dots×40 dots is extracted by FEU 10 (as shown in the lower portion of FIG. 2).

It is noted that the FE data includes an intensity level value at the $800^{th}$ one of 1,600 pieces of I (intensity) data in one block (one data, which is referred to as "median value"), representative values (20 data×2) that are obtained by adding data at intervals of 2 dots with respect to the I (intensity) data in the X-direction and the Y-direction, and dispersion values (3 data×2) of data that are obtained respectively by adding data for the I (intensity), (R−I) chromatic difference and (G−I) chromatic difference, respectively, at intervals of 2 dots in the X-direction and the Y-direction.

FEPM_FIFO 11 transfers the FE data as a command that is extracted from each of the blocks by FEU 10 to PMU 12 that performs pattern matching. The FE data is written in SRAM 3, and the FE data is retrieved into PMU 12 from the SRAM 3 by addressing. The data is transferred in bucket units composed of a plurality of blocks.

PMU 12 performs pattern matching between the FE data for each block extracted by FEU 10 and each bank note data in a bank note database stored in SRAM 3. When there is a match, the pattern matched data (hereunder referred to as "PM data") is written in SRAM 3. It is noted that, during the pattern matching, median values and dispersion values in the FE data are screened by the bank note data, and the degree of similarity of each of the FE data that pass the screening is calculated with representative values of the respective FE data, and comparison operations are performed. When the degree of similarity exceeds a specified threshold value, a determination is made that the FE data matches the bank note data, and MC 4 performs a structure matching operation. The pattern matching is performed for each of the blocks in which the feature extraction is conducted, and matching or mismatching of patterns between an object image and a reference image is determined for each of the blocks.

PM data includes a bank note ID, a block ID and a rotation ID. The bank note ID indicates the type of a bank note that is subject to the detection, and that may be selected from major bank notes (for example, one-thousand yen note, five-thousand yen note, ten-thousand yen note, and the like). The block ID indicates which of the blocks of the bank note correspond to the detected PM data. The block ID includes 1 through 3 (i.e., BLK1, BLK2 and BLK3). When the detected blocks are used to define a triangle, the block ID represent flags that indicate which of the apexes of the triangle correspond to the blocks. The rotation ID indicates how much the detected block is inclined. The rotation ID includes 1 through 4 that indicate four quadrants (first quadrant through fourth quadrant), respectively, and includes 1 through 6 that indicate angles of the block in each of the quadrants, respectively. Accordingly, the bank note ID, the block ID and the rotation ID indicate what kind of bank note is detected, which ones of the blocks of the bank note are detected, and how much the blocks are inclined.

Figure 5:
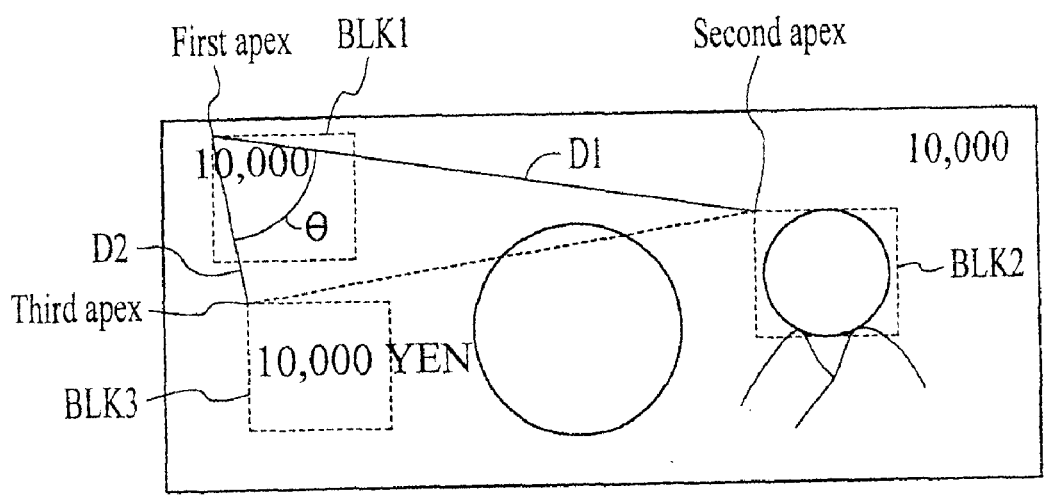
FIG. 5 shows an illustration to describe the conventional technology of identifying selected points of a 10,000 yen note.

Bank note data stored in SRAM 3 may be prepared for a variety of bank notes such as a Japanese ten-thousand yen note, U.S. dollar bills and the like, such that pattern matching can be performed for these bank notes. For example, three characteristic areas (as shown in FIG. 5) are extracted from a bank note, and a data set for each of the areas consisting of 40 dots×40 dots (in a size of an approximately 2 cm square) is formed. Each of the three data sets includes six (6) data taken at intervals of 15° through rotating the data (3 areas×6 data in total). The six data taken at intervals of 15° through rotating the data cover a rage from zero (0) degree to 90 degree (that corresponds to the first quadrant). Data sets for the second, third and fourth quadrants are formed by converting the six data sets in the first quadrant into data sets symmetrical about the Y-axis, the original point and the X-axis, respectively.

The rotated data sets are prepared for such occasions in which a bank note in an inclined position is read by the scanner SC.

PMMC_FIFO 13 is a FIFO that transfers the PM data provided by PMU 12 to MC 4 as a command. It is noted that the PM data is written in SRAM 3, and the PM data is handed over to MC 4 from SRAM 3 by addressing.

MC_IF 14 is an interface to be used when MC 4 accesses SRAM 3.

CU 15 functions as an interface when MC 4 sets each of the units and reads conditions thereof, and allows MC 4 to access ROM 16 and perform parallel communication with the host computer HC. CU 15 receives commands from the host computer HC through a bus. Also, the host computer HC reads a read register (not shown) to obtain data and statuses.

ROM 16 is a ROM for a monitor program. The monitor program is provided for communication with the host computer HC and management of minimum hardware. A program for the bank note recognition system 1 is downloaded from the host computer by the function of the monitor program.

SRAM 3 stores the IRG data of 50 dpi provided from RSU 8 in ImageBuffer region (not shown), the FE data provided from FEU 10 in PMBuffer region (not shown), the PM data provided from PMU 12 in PMBuffer region (not shown) and the bank note data base required by PMU 12 for pattern matching in DataBase region.

MC 1 performs an overall control of the bank note recognition system 1, communication with the host computer HC, and structure matching for pattern matching results provided by PMU 12. In the structure matching, three of the PM data that meet specified conditions (block BLK1, BLK2 and BLK3) are selected. A distance between the block BLK 1 as being a base point among the three blocks and the block BLK1 and a distance between the block BLK 1 and the block BLK3 (the lengths of two line segments), and an angle defined therebetween (an included angle between the two line segments) are calculated, and compared with corresponding data in the stored database for structure matching. When the lengths of the two line segments and the included angle concur with the stored data, a determination is made that the image read from the scanner SC (i.e., the object image) corresponds to the bank note (i.e., the reference image) (or is included in the bank note.) The calculation and determination of the distance (length) and the angle in the structure matching are described in detail below.

DRAM 5 stores a program and the database for structure matching downloaded from the host computer HC, and also provides a work area for MC4. DRAM 5 also provides a region to form a list of all of the results of pattern matching performed by PMU 12.

Construction of Image Determination System

So far, an outline of a bank note recognition system in accordance with one embodiment of the present invention has been described. In connection with the bank note determination system 1, an image determination system in accordance with one embodiment of the present invention is further described in detail.

An image determination system in accordance with one embodiment of the present invention includes MC4 and DRAM 5. MC4 acts as an operation section or a determination section. DRAM is used as a data storage section.

PM data (matched data) corresponding to a block in which the degree of similarity is determined to exceed over a specified threshold value as a result of the pattern matching operation by PMU 12 is inputted in MC4 from SRAM 3. The PM data to be inputted in MC4 is computer readable data. The PM data includes a bank note ID, a block ID and a rotation ID. Also, the PM data includes position data. The position data indicates X-direction and Y-direction coordinates of the block in the inputted image (provided by the scanner SC). In other words, the PM data has identification data and positional data.

Figure 3:
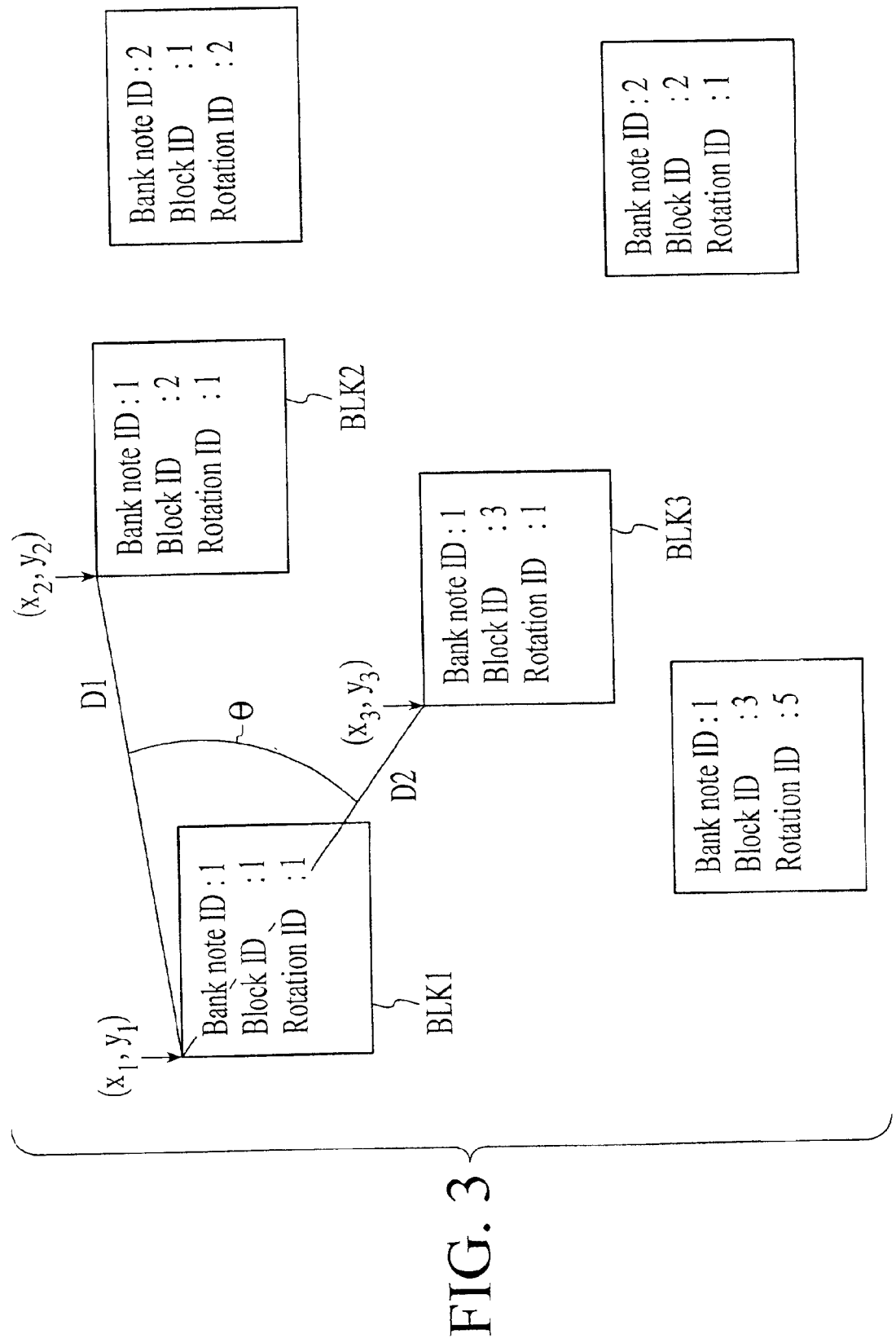
FIG. 3 shows illustrations to describe the calculation of relative positional relations in an image determination system in accordance with one embodiment of the present invention.

Among the inputted PM data, identified blocks in which the bank note IDs and the rotation IDs are in agreement are subject to a determination process to determine whether or not a triangular set of block ID combinations 1 through 3 exist. When such a combination exists, the relative positional relations D1, D2 and θ among the blocks are calculated as shown in FIG. 3. In other words, a determination is made whether or not there exists a triangle composed of three matched blocks (PM data), i.e., a block BLK1 as being a first apex, a block BLK2 as being a second apex and a block BLK3 as being a third apex. When such a triangular set of block IDs exists, the relative positional relations D1, D2 and θ are calculated. When a plurality of such triangular sets exist, the relative positional relations D1, D2 and θ for each of the triangles are calculated.

It is noted that FIG. 3 shows a case in which six PM data units are inputted in MC4. In other words, six matching blocks were detected in the pattern matching operation. Three of the blocks, i.e., three of the PM data units, shown in the upper left area of FIG. 3 have matching bank note IDs and matching rotation IDs. These three blocks also form a triangular set of block IDs, i.e. 1 through 3. In other words, the three blocks are blocks BLK 1, BLK2 and BLK3. MC4 therefore calculates the relative positional relations D1, D2 and θ among three blocks BLK1, BLK2 and BLK3. However, the calculation is not performed when the bank note ID or the rotation ID is not in agreement. FIG. 3 shows a case in which a single triangular set of blocks BLK1, BLK2 and BLK3 exists. However, when two blocks BLK3 exist, instead of one block BLK3, two triangular sets can be defined. In this case, the relative positional relations D1, D2 and θ for each of the triangles are calculated.

It is noted that a distance D1 is defined between the block BLK1 and the block BLK2, a distance D2 is defined between the block BLK1 and the block BLK3, and an included angle θ is defined between a line segment (edge) defined between block BLK1 and block BLK2 and a line segment defined between block BLK1 and block BLK3. The calculation thereof is performed by a simplified calculation to be described below.

MC4 determines whether or not calculated relative positional relations D1c, D2c and θc are in agreement with relative positional relations D1r, D2r and θr registered in the database for structure matching stored in DRAM 5. When they are in agreement, a determination is made that the object image read by the scanner SC corresponds to the reference image that is a bank note. (It is noted that an added letter c indicates a calculation value, and an added latter r indicates a reference value.) The determination is made in this manner because the condition of agreement of the relative positional relations D1, D2 and θ literally corresponds to one of the conditions of congruence for triangles, i.e., "agreement of the lengths of two edges and an included angle thereof", and therefore the structure matching can be performed without, any uncertainty by looking at the agreement of the relative positional relations D1, D2 and θ. Table 1 below is an example of a structure of a database for structure matching. In this example, the database stores data in a form appropriate for the simplified calculation.

TABLE 1

Example of Database Structure for Structure Matching

| Bank Note ID | D1r | D2r | θ |
|---|---|---|---|
| 1 | 5 | 2 | 60 |
| . | . | . | . |
| . | . | . | . |
| . | . | . | . |
| N | | | |

It is noted that the structure matching is conducted for blocks in which both of the bank note ID and the rotation ID are in agreement because of the following reasons. When the rotation ID is in agreement but the bank note ID is not in agreement, or when the bank note ID is in agreement but the rotation ID is not in agreement, there is no possibility that a bank note can be perfectly copied, or that such a copy, if made, could be confused for a proper bank note. Accordingly, the structure matching, and its corresponding processing drain, is performed only when there is a possibility that a bank note may be perfectly copied, and thereby prevents the system from unnecessarily slowing its throughput.

In accordance with the present invention, the relative positional relations D1, D2 and θ are calculated by a simplified calculation. When positional data for block BLK1 is defined by plane coordinates $(x_1, y_1)$, positional data for block BLK2 is defined by plane coordinates $(X_2, y_2)$, and positional data for block BLK3 are given by plane coordinates $(x_3, y_3)$, as shown in FIG. 3, relative positional relations D1c, D2c and θc are calculated by the following simplified calculations:

$$D1c=(x_2-x_1)^2+(y_2-y_1)^2$$

$$D2c=(x_3-x_1)^2+(y_3-y_1)^2$$

$$\theta c=(x_2-x_1)(x_3-x_1)+(y_2-y_1)(y_3-y_1)$$

It is noted that the relative positional relations D1r, D2r and θr registered in the database for structure matching (see Table 1) stored in DRAM 5 are stored in a data format corresponding to that of the relative positional relations D1c, D2c and θc obtained by the calculation.

In this manner, the relative positional relations D1, D2 and θ are obtained by the simplified calculation, and the database for structure matching is stored in a format appropriate for the simplified calculation, the structure matching can be performed by addition and multiplication without using calculations of square root, division and inverse trigonometric function. Accordingly, this prevents the system from lowering its processing speed. As a result, an inexpensive microcomputer available on the market can be used as MC4 that performs the structure matching. An expensive microcomputer or a specially designed microcomputer is not required.

As for the timing of the structure matching, the structure matching can be performed after PMU 12 completes the entire pattern matching operation. Alternatively, the structure matching can be performed during the pattern matching operation each time a matching block is detected (i.e., PM data is generated). For example, PM data obtained as a result of the pattern matching may be stored in DRAM 5 in a list structure. Each time PM data is generated, such data is added to the end of the list, and the structure matching may be performed between the PM data added to the end of the list and PM data that had been present in the list. As a result, the presence of a bank note is detected and copying thereof can be cancelled at an earlier stage. Also, once an operation is done, the same operation does not have to be repeated.

Figure 4:
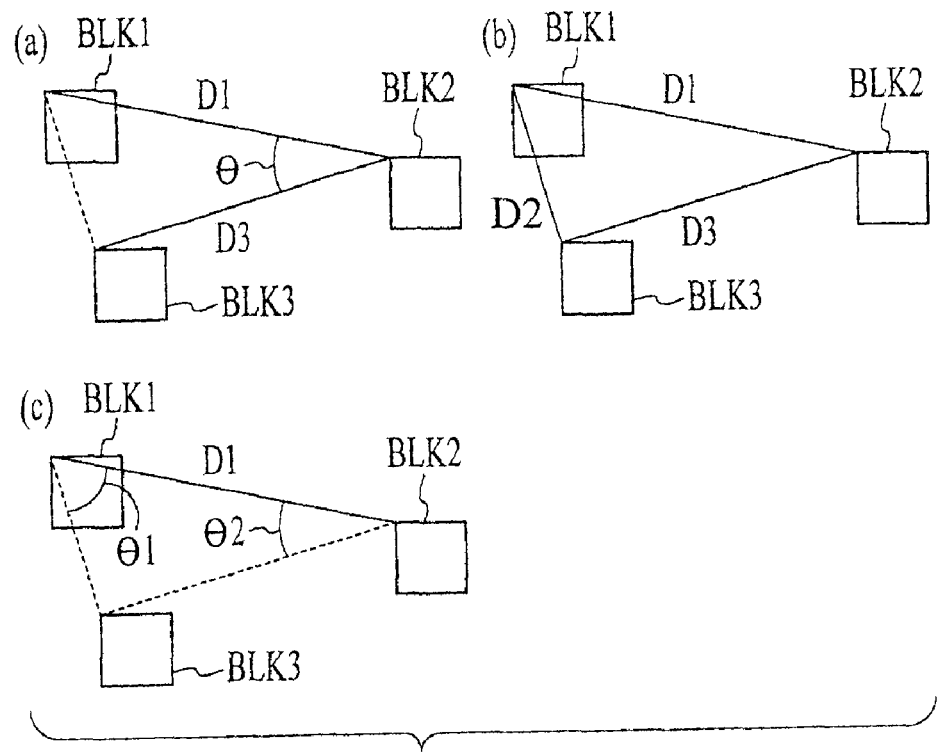
FIG. 4 shows illustrations of different relative positional relations in an image determination system in accordance with different embodiment of the present invention.

Relative positional relations, when a block BLK 1, a block BLK2 and a block BLK3 are assumed to form a triangle, may be determined by D1, D3 and θ, as shown in FIG. 4(a). Alternatively, relative positional relations may be determined by D1, D2 and D3, as shown in FIG. 4(b). Furthermore, relative positional relations may be determined by D1, θ1 and θ2, as shown in FIG. 4(c). It is noted that FIGS. 4(a) to 4(c) show examples, and the present invention is not limited to those shown in the figures.

The length calculation and determination device in accordance with the first embodiment of the present invention and the angle calculation and determination device in accordance with the second embodiment of the present invention are included in the means for obtaining relative positional relations D1c, D2c and θc by calculation and comparing them with relative positional relations D1r, D2r and θr stored in a database for structure matching in the structure matching operation described above. Accordingly, the description of the respective devices is omitted.

The embodiments of present invention are described above. However, the present invention is not limited to the particular means or methods described above. Many modifications can be made within the scope of the subject matter of the invention as long as they achieve the objects of the present invention and provide the effects of the present invention. It is noted that the structure matching can be performed using congruence conditions for any polygon.

As described above, in accordance with the first through third embodiments of the present invention (i.e., a length calculation and determination device, a angle calculation and determination device and a image determination system), calculation and determination of the length (distance) of line segments and angles can be performed by an inexpensive hardware such as a microcomputer that is available in the market. Also, by an image determination system in accordance with the third embodiment of the present invention, a determination can quickly and accurately be made as to whether or not an object image that may be read by a scanner, for example, corresponds to a reference image stored in a database.

What is claimed is:

1. A method of identifying a target pattern in an image, said method comprising:
   a) establishing an inventory of characteristic pattern points within said target pattern and establishing a first record of relative distances between selected characteristic pattern points, said relative distances being recorded as the square of the actual distances between said selected characteristic pattern points;
   b) partitioning said image into a plurality of sub-image points;
   c) identifying at least two sub-image points having attributes substantially similar to a corresponding two of said characteristic pattern points;
   d) calculating the square of the distance between said identified two sub-image points and comparing said calculated square to the recorded relative distance of said corresponding two characteristic pattern points;
   e) determining that said target pattern has not been identified in response to no match being found in step (d);
   wherein step(a) further includes:
      grouping characteristic pattern points into three-point sets defining a first angle having a characteristic pattern point at a vertex and two characteristic pattern points at side-ends of said first angle, the square of the distance between said vertex and each of the side-ends being part of said first record;
      establishing a second record of first angle parameters proportional to a corresponding first angle within said three-point sets;
      assigning an identification indicator to all three characteristic pattern points in each three-point set specifying which characteristic pattern point is at the vertex position and which are at either of the side-end positions of said first angle;
      each first angle parameter being defined as the product of its corresponding first angle's side-lengths multiplied by the cosine of its corresponding first angle;

wherein said identified sub-image points are given the identification indicator of their correspondingly matched characteristic pattern points, and further including;

f) calculating a second angle parameter of a second angle defined by three identified sub-image points corresponding to a complete three-point set of characteristic pattern points, the vertex of said second angle being the sub-image point whose identification indicator corresponds to the characteristic pattern point that is the vertex of said first angle; and comparing said second angle parameter with said first angle parameter of said corresponding three-point set;

wherein said sub-image points forming the side-ends of said second angle are defined by X,Y coordinates of a cartesian plane having positional value relative to the sub-image point identified as the vertex of said second angle; said second angle parameter being defined as the sum of the product of the X coordinates and the product of the Y coordinates of said sub-image points at the side-ends of said second angle.

2. The method of claim 1 wherein the calculation of step (d) includes summing the square of the difference between respective X coordinates of said two identified sub-image points and the square of the difference between respective Y coordinates of said identified sub-image points.

3. The method of claim 1, wherein selected pattern characteristic pattern points whose relative distances constituting said first record have an associated identification indicator identifying them as a recorded two-point set, said identified sub-image points being given the identification indicator of their correspondingly matched characteristic pattern points, and the square of the distance between said identified sub-points being calculated in step (d) only when their given identification indicator indicates that their corresponding characteristic pattern points are part of the same two-point set.

4. The method of claim 1 wherein said identified pub-image points are given the identification indicator of their correspondingly matched characteristic pattern point, and step (d) is implemented only when said identified sub-image points correspond to a complete three-point set.

5. The method of claim 1, further including:

g) determining that said pattern has been identified in response to said second angle parameter matching said first angle parameter and the square of the distance of the side-ends of said second angle matching the square of the distance of the side-ends of said first angle.

6. The method of claim 1 wherein each sub-image point is defined as a plurality of picture elements of said image.

7. The method of claim 1 further including combining the image information of said plurality of picture elements in each sub-image point into a representative composite, and comparing said composite to said characteristic pattern points.

8. A method of identifying a target pattern in an image, said method comprising;

a) establishing an inventory of characteristic pattern points said target pattern;

b) grouping Bald characteristic pattern points into three-points sets defining a first angle having a characteristic pattern point at a vertex of said first angle and two characteristic pattern points at side-ends of said first angle, assigning an identification indicator to all three characteristic pattern points in each three-point set specifying which pattern point is at the vertex position and which pattern points are at the side-end positions of said first angle;

c) establishing a first record of a respective first angle parameter proportional to a corresponding first angle within each three-point set, each first angle parameter being defined as the product of its corresponding first angle's side-lengths multiplied by the cosine of its corresponding first angle;

d) partitioning said image into a plurality of sub-image points;

e) identifying at least three sub-image points having attributes substantially similar to a corresponding three of said characteristic pattern points;

f) calculating a second angle parameter characteristic of a second angle defined by said three identified sub-image points, and comparing said second angle parameter to said first angle parameters;

g) determining that said target pattern has not been identified in response to no match being found in step (f)

wherein:

step (e) includes assigning paid identified sub-image points the identification indicator of their corresponding characteristic pattern point, and step (f) is implemented only when said identified sub-image points correspond to a complete three-point set;

said vertex of the second angle calculated in step (f) is the sub-image point whose identification indicator corresponds to the characteristic pattern point that is the vertex of the corresponding complete three-point set; and the calculated second angle parameter is compared with the first angle parameter of said corresponding three-point set; and said sub-image points forming the side-ends of said second angle are defined by X,Y coordinates of a cartesian plane having positional value relative to the sub-image point identified as the vertex of said second angle; said second angle parameter being defined as the sum of the product of the X coordinates and the product of the Y coordinates of paid sub-image points at the side-ends.

9. The method of claim 8, wherein the three characteristic pattern points of each three-point set constitute a triangle and said method includes determining a separate first angle parameter for each of the three angles of said triangle; and said step (f) further including calculating said second angle parameter for each of the three angles formed by said identified three sub-image points, and comparing the three calculated second angle parameters with their corresponding three first angle parameters; and said step (g) includes determining that said target pattern has been identified in response to all three second angle parameters matching their corresponding three first angle parameters.

10. The method of claim 8, wherein the three characteristic pattern points of each three-point set constitute a triangle and step (c) further includes establishing a second record of first length parameters defined as the square of the distances between the characteristic pattern points forming the sides of said triangle; and step (f) further includes calculating a second length parameter defined as the square of the distances between said identified three sub-image points in correspondence to the sides of said triangle defined by their corresponding three-point set, and comparing said second length parameters to their corresponding first length parameters.

11. The method of claim 8 wherein step (g) further includes determining that said target pattern has been identified in response to two of said second length parameters matching their respective first length parameters and said second angle parameter matching its respective first angle parameter.

12. The method of claim 8 wherein said method includes determining a separate first angle parameter for each of the three angles of said triangle; step (f) includes calculating second angle parameters for the angles defined by said three identified sub-image points; and step (g) further includes determining that said target pattern has been identified in response to two of said second angle parameters matching their corresponding first angle parameters and at least one of said second length parameter matching its respective first length parameter.

13. The method of claim 8 wherein the calculation of said second length parameters includes summing the square of the difference between respective X coordinates of two corresponding sub-image points and the square of the difference between respective Y coordinates of said two corresponding sub-image points.

14. A pattern recognition system for identifying a target pattern within an image, said pattern recognition system comprising:
  a memory store holding first key data descriptive of selected characteristic pattern points within said target pattern, said characteristic pattern points being grouped into three-point sets constituting a first triangle, said first key data including at least one of first length attribute data and first angle attribute data, said first length attribute data being the square of the sides of said first triangle, said first angle attribute data corresponding at least to one of the three angles within said first triangle and being the cosine of a first angle multiplied by the length of the sides adjoining said first angle;
  a processing unit having access to said memory store and having an input for receiving second key data descriptive of selected sub-image points of said image, said selected sub-image points having image attributes substantially similar to corresponding characteristic pattern points and said second key data including position information of its corresponding sub-image point, said processing unit collecting said second key data into data groups corresponding to three sub-image points constituting a second triangle and using said position information to calculate at least one of second length attribute data and second angle attribute data distinctive of said second triangle, said processing unit comparing available second length attribute data to available first attribute data and comparing available second angle attribute data to available first angle attribute data to determine whether said second triangle is congruent to said first triangle;
  wherein said processing unit includes a calculation unit producing said second length attributes data and said second angle attribute data said calculation unit identifying the relative positions of each said sub-image points in said second triangle as X,Y displacement coordinates of a cartesian plane relative to a chosen sub-image point of said second triangle, said second length attribute data being calculated as the square of a side of said second triangle; and
  wherein the second angle attribute data of a chosen angle coincident with said chosen sub-image point being calculated as the sum of the product of the X displacement coordinates and the product of the Y displacement coordinates of the two sub-image points defining the sides of said second triangle adjacent said chosen angle.

15. The pattern recognition system of claim 14, wherein said group of three sub-image points corresponds to a complete three-point set of characteristic pattern points such that said second triangle of selected sub-image points corresponds to a specific first triangle of characteristic pattern points, and said processing unit further compares each second triangle only to its corresponding first triangle.

16. The pattern recognition system of claim 14, wherein said processing unit determines that said second triangle is congruent to said first triangle in response to the second length attribute data of said second triangle's three sides matching the first length attribute data of said first triangle's three sides.

17. The pattern recognition system of claim 14, wherein said processing unit determines said second triangle is congruent to said first triangle in response to at least one second angle attribute data value matching one first angle attribute data value and two second length attribute data values matching two first length attribute data values.

18. The pattern recognition system of claim 14, wherein said processing unit determines said second triangle is congruent to said first triangle in response to three second angle attribute data values matching three first angle attribute data values.

19. The pattern recognition system of claim 14, wherein said memory store further holds an identifying indicator specifying the three-point set to which each characteristic point belongs, said pattern recognition system further including:
  a pattern matching unit receiving sub-image point data of said image and comparing said sub-image point data to said characteristic pattern point data, said pattern matching unit flagging each sub-image point data that substantially matches a characteristic pattern point data and assigning it the identifying indicator of its correspondingly matched characteristic pattern point data, said flagged sub-image point data being part of said second key data.

20. The pattern recognition system of claim 14, wherein said processing unit groups said second key data into groups of three sub-image points corresponding said three-point sets as determining by said identifying indicator, the calculation of said second length attribute data and said second angle attribute data being conducted only on groups of selected sub-image points that constitute a complete three-point set.

* * * * *

UNITED STATES PATENT AND TRADEMARK OFFICE
CERTIFICATE OF CORRECTION

PATENT NO. : 6,888,966 B2
DATED : May 3, 2005
INVENTOR(S) : Hisao Sato et al.

It is certified that error appears in the above-identified patent and that said Letters Patent is hereby corrected as shown below:

Column 13,
Line 28, change "wherein selected pattern" to -- wherein selected --;
Line 39, change "pub" to -- sub --;
Line 60, change "points said" to -- points within said --;
Line 61, change "grouping Bald" to -- grouping said --.

Column 14,
Line 40, change "paid" to -- said --.

Signed and Sealed this

Thirtieth Day of August, 2005

JON W. DUDAS
*Director of the United States Patent and Trademark Office*